United States Patent
Teicher et al.

(10) Patent No.: US 10,351,080 B2
(45) Date of Patent: Jul. 16, 2019

(54) ARRANGEMENT FOR ELECTRICALLY CONNECTING ELECTRICAL ELEMENTS TO A CENTRAL UNIT IN A MOTOR VEHICLE

(71) Applicant: NEXANS, Paris (FR)

(72) Inventors: Hermann Teicher, Kohlberg (DE);
Gerhard Lindner, Plossberg (DE);
Helmut Steinberg, Stornstein (DE)

(73) Assignee: NEXANS, Courbevoie (FR)

( * ) Notice: Subject to any disclaimer, the term of this patent is extended or adjusted under 35 U.S.C. 154(b) by 175 days.

(21) Appl. No.: 14/833,314

(22) Filed: Aug. 24, 2015

(65) Prior Publication Data

US 2016/0075292 A1    Mar. 17, 2016

(30) Foreign Application Priority Data

Sep. 12, 2014   (EP) .................................. 14306407

(51) Int. Cl.
| | | |
|---|---|---|
| *B60R 16/02* | (2006.01) | |
| *H02G 15/013* | (2006.01) | |
| *H01R 35/02* | (2006.01) | |
| *B60R 16/027* | (2006.01) | |
| *H02G 11/00* | (2006.01) | |

(52) U.S. Cl.
CPC ........ *B60R 16/0215* (2013.01); *B60R 16/027* (2013.01); *H01R 35/02* (2013.01); *H02G 11/00* (2013.01); *H01R 2201/26* (2013.01)

(58) Field of Classification Search
USPC .............................. 307/10.1; 374/72 A, 72 R
See application file for complete search history.

(56) References Cited

U.S. PATENT DOCUMENTS

| | | | | |
|---|---|---|---|---|
| 5,685,728 A | * | 11/1997 | Okuhara | ............... B60R 16/027 439/15 |
| 6,534,713 B2 | * | 3/2003 | Kafer | .................. B60R 16/0215 174/72 A |
| 6,752,655 B1 | | 6/2004 | Kaczmarek | |
| 7,020,931 B1 | | 4/2006 | Burnett et al. | |
| 7,137,173 B2 | * | 11/2006 | Sipple | ..................... D06F 39/14 16/223 |
| 7,943,854 B1 | | 5/2011 | Lipp | |

FOREIGN PATENT DOCUMENTS

| | | |
|---|---|---|
| DE | 10259980 | 9/2004 |
| WO | 2009011624 | 1/2009 |

OTHER PUBLICATIONS

Search Report dated 2015.

* cited by examiner

*Primary Examiner* — An T Luu
(74) *Attorney, Agent, or Firm* — Sofer & Haroun, LLP

(57) ABSTRACT

An arrangement (1) is provided for electrically connecting a movable structural component of a motor vehicle mounted on a central unit with electrical elements in a body of a motor vehicle. The movable structural component is pivotally fastened about at least two points of rotation (12) to an axis of rotation (9') on the vehicle body. A number of electrical elements are connected to the electrical lines fastened to a cable set (2) which is partially mounted in a free space between the vehicle body and the movable structural component. The cable set (2) is arranged and secured with a straight configuration between two points of rotation (12) surrounded by a protective element. The center axis (9") of the cable set (2) corresponds at least partially to the axis of rotation of the movable component.

2 Claims, 2 Drawing Sheets

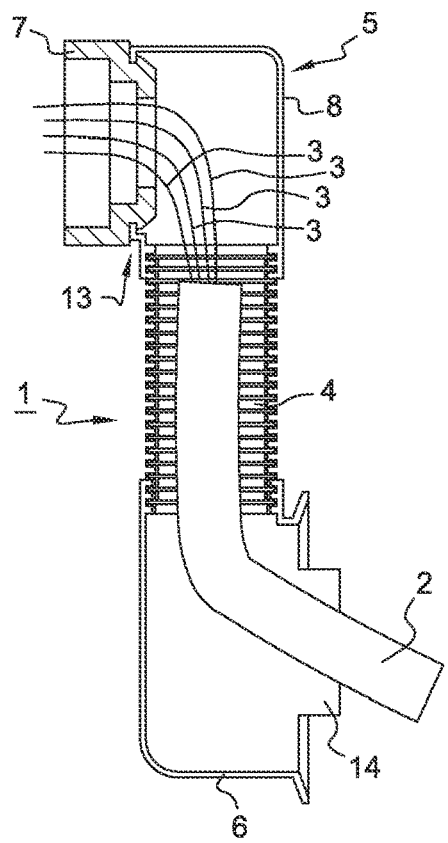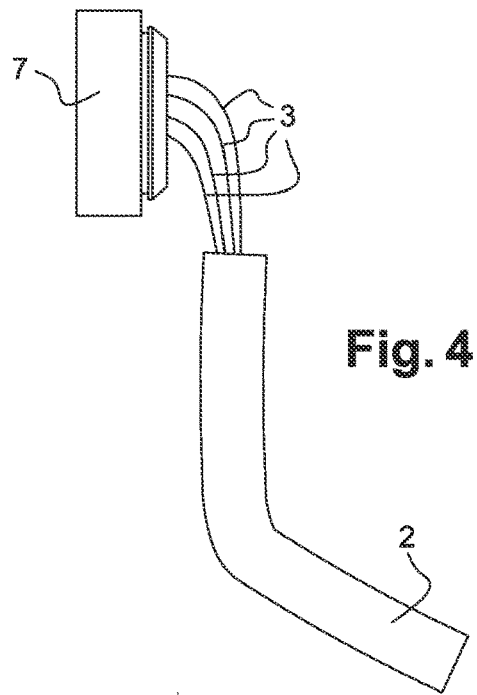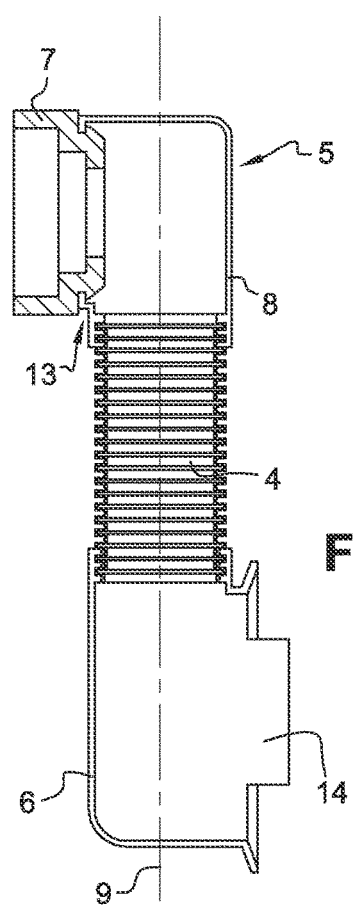

ARRANGEMENT FOR ELECTRICALLY CONNECTING ELECTRICAL ELEMENTS TO A CENTRAL UNIT IN A MOTOR VEHICLE

RELATED APPLICATION

This application claims the benefit of priority from European Patent Application No. EP 14 303 407.9, filed on Sep. 12, 2014, the entirety of which is incorporated by reference.

BACKGROUND

Field of the Invention

The invention relates to an arrangement for electrically connecting electrical elements mounted on a movable structural component of a motor vehicle, with a central unit mounted on the body of the motor vehicle, wherein the movable component is fastened so as to be able to be pivoted about an axis of about two points of rotation, wherein a number of electrical lines connected to the electrical elements are combined into a cable set which is partially mounted in a free space between the vehicle body and the movable component.

In a motor vehicle, electrical elements or devices, which have to be supplied with electrical current and/or which receive or send signals must be supplied with electrical current. Among the electrical elements are, for example, light diodes in lamps and back lights, motors for lifting and lowering the windows, for controlling the rear view mirror, and the illuminations of the dashboard. The electrical elements are joined together in the known manner by means of electrical lines, which are combined in cable sets and are connected to a centrally located central unit arranged in the car body. The central unit comprises a voltage source, for example, a direct current battery, and may additionally have signal sources, for example, a processor (central processing unit, CPU) and/or controlled elements.

Movable structural components which are pivotal about an axis of rotation of the motor vehicle are for example, all doors thereof. The electrical devices arranged at or in the doors have to be connected through cable sets to the central unit in the car body. In this connection, a cable set containing the necessary electrical lines must penetrate through the free space between body and door. Generally, a cable set surrounded by a sealing hose is positioned in the free space approximately perpendicular of the axis of rotation of the door. By opening and closing the doors, the electrical lines are moved back and forth in the sealing hose and are pulled from or pushed into the vehicle body. This stretching and upsetting constitutes a pressure or upsetting load which permanently mechanically acts on the lines, so that they may become damaged or destroyed. In addition, the sealing hose is also continuously bent when moving the door. Accordingly, this sealing hose is also subjected to significant mechanical loads and has a limited service life. A damaged sealing hose can no longer exert a correct sealing function, so that in particular, moisture and dirt can penetrate into the cable set and up to the electrical devices.

The invention is based on the object of constructing the above described device in such a way that the electrical lines are subjected to as little a mechanical load as possible and the space between is tightly sealed and mechanically protected.

OBJECTS AND SUMMARY

In accordance with the invention, this object is met in that the cable set is arranged with a straight extension located in the area between two points of rotation and is surrounded and secured in this area between two points of rotation by a protective element, and the center axis of the cable set corresponds at least approximately to the center axis of the movable component.

In this arrangement, the electrical lines of the cable set are mounted in the pivoting range between the car body and the vehicle door so as to be parallel to the axis of rotation of the vehicle door. The center axis of the cable set corresponds to the neutral fiber thereof. It coincides approximately with the axis of rotation of the door over a relatively long stretch. Because of the fact that the neutral fiber of the cable set coincides with the axis of rotation of the vehicle door and the cable set is secured in the protective element, the electrical lines are not subjected to pressure and tension forces when the door is opened and closed, and they are practically not being bent. Only a slight rotation or torsion of the lines occur. The torsion angle is limited to the opening angle of the door. It is, for example, in the case of the driver and passenger doors, at most 90 degrees and for pivoting doors, for example of small transporters, approximately at most 270 degrees.

The protective element serves for the mechanical protection as well as the media tight sealing of the cable set in the space between the door and the car body. By fastening the cable set in the protective element, this protective element is additionally protected against tension and pressure forces. The protective element itself is also, due to the arrangement according to the invention, subjected only to a slight torsion when the vehicle door is opened and closed. Consequently, the service life of the tire arrangement according to the invention, with cable set and protective element, is advantageously increased as compared to the known arrangement.

BRIEF DESCRIPTION OF THE DRAWINGS:

Embodiments of the subject matter of the invention are illustrated in the drawings. In the drawings:

FIG. 3 schematically shows an arrangement according to the invention, in a longitudinal sectional view.

FIG. 4 schematically shows a cable set of the arrangement according to FIG. 3, and FIG. 5 schematically shows a protective element of the arrangement according to FIG. 3, in a longitudinal sectional view.

DETAILED DESCRIPTION:

In the following, the invention will be explained with the aid of a driver or passenger door of a motor vehicle pivotal about an axis of rotation, representative for all other possible movable structural components.

The vehicle door can be equipped with a number of current users, for example, window lifting devices, locking mechanisms and warning lights. The current users are supplied with current in the known manner and connected to the central unit of the motor vehicle through a cable set or a cable tree, which for this purpose includes a required number of electrical lines.

Figure 1:
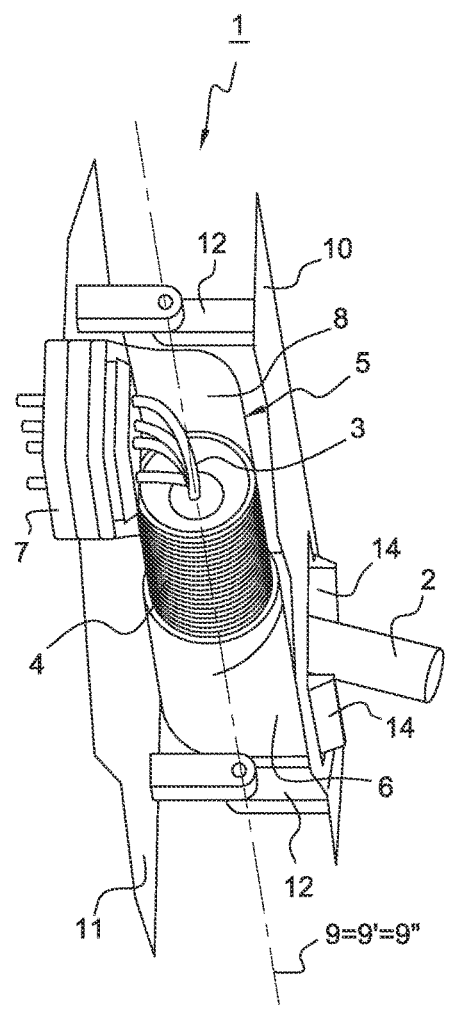
FIG. 1 and FIG. 2 show schematically in a perspective view an arrangement according to the invention, mounted between a motor vehicle body and a movable component of the motor vehicle, in a position of rest and in a pivoted position.
Figure 2:
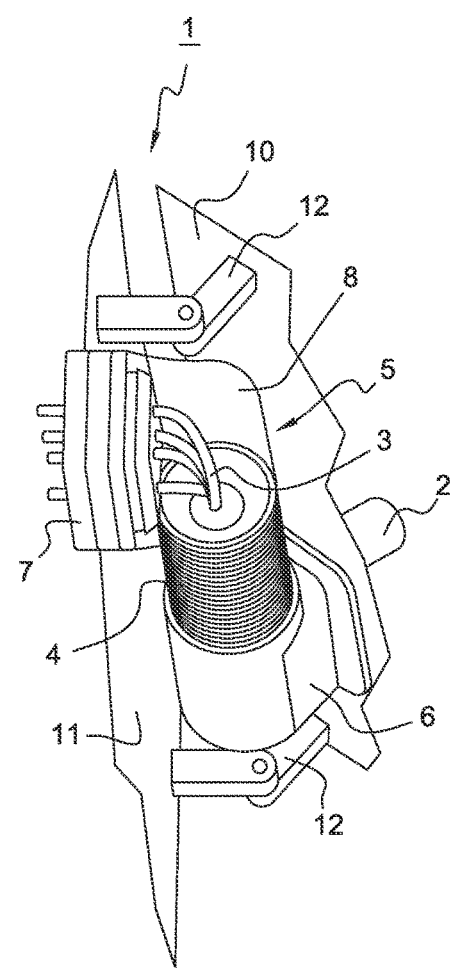

When in use, the arrangement 1 according to the invention is located in the free space or intermediate space between the motor vehicle body and the vehicle door. This is schematically illustrated in FIGS. 1 and 2. The walls of the door and the body are schematically illustrated in connection with reference numerals 10 and 11. The vehicle door is pivotally connected to the body, namely through the hinges 12, illustrated as examples. The door can be pivoted from the position of rest or closing position (FIG. 1) into the opening position (FIG. 2) about its axis of rotation 9'. The arrangement 1 is arranged between the hinges 12 as the points of rotation in such a way that the lines 3 extend vertically between the door and the vehicle body.

The arrangement 1 includes a cable set 2 surrounded by a protective element. In FIG. 3 the arrangement 1, according the invention, is shown in a longitudinal sectional view. FIG. 4 shows the cable set 2 provided with the passage part 7 separately for better clarity. The cable set 2 is primarily shown as a compact element, however, the cable set 2 may also be provided with a number of electrical lines 3. The lines 3 may be placed loosely next to each other or may be held together, for example, by means of cable binders, winding tape or may be held together within a hose. In FIGS. 1 to 4, four lines 3 are illustrated. The number of lines 3 correspond to the number of electrical devices which are mounted at the vehicle door and must be connected to a central unit of the vehicle body. The individual lines 3, which are known in principle and not illustrated in detail for this reason, each consist of an electrical conductor surrounded by an insulation. The material of the conductor is, for example, aluminum.

The protective element, which in FIG. 5 is separately illustrated for better clarity, consists in the illustrated embodiment of a hose 4 provided with an undulation that surrounds the cable set 2 as well as the ends of the hose 4 in a media tight manner, and of sealing elements 5, 6 also mounted in a media tight manner to the ends of the hose 4. The hose 4 can also be constructed smooth or may be structured otherwise. Advantageously, the hose 4 surrounds the cable set 2 relatively tightly so that the hose 4 rests against the outer lines 3 of the cable set 2 and the lines 3 cannot yield radially in the hose 4. A sealing element 5, 6 each is mounted respectively at the vehicle body and vehicle rear door and permits the media tight passage of the cable set 2 through a wall of the vehicle body and the vehicle door. This can be seen in FIGS. 1 and 2. in the illustrated embodiment, the first sealing element 5 consists of the passage part 7 and a first angle element 8.

Passage part 7, through which the four lines 3 extend, is connected in a media tight manner to the first sealing element 5. The connection consists, for example, of a locking connection 13, as illustrated in FIG. 3. The first angle element 8 is illustrated in a transparent manner for better clarity in FIGS. 1 and 2. The second sealing element 6 constitutes a second angle element. The passage part 7 and the second angle element 6 guide the cable set 2 through the motor vehicle door wall and through the vehicle body wall. The sealing elements 5, 6 and the hose 4 consist, for example, of synthetic material or rubber or silicone.

In the illustrated embodiment, the passage part 7 serves to secure the cable set 2 and to seal the same at its transition between vehicle body and vehicle door. The passage part 7 is constructed in such a way that its internal diameter corresponds approximately to the diameter of the cable set 2. This has the result that its internal diameter corresponds approximately to the diameter of the cable set 2. Consequently, the cable set 2 is not subjected to compressive and tensile loads when the vehicle door is opened and closed.

Reference will now be made again to FIGS. 1 and 2. The arrangement 1, according to the invention, is mounted in such a way that the principle axis 9 of the protective element and the middle axis 9" of the cable set 2, which corresponds to its neutral fiber, coincides with the axis of rotation 9' of the door. In the illustrated embodiment, the arrangement 1 is arranged between the hinges 12. The distance in which the neutral fiber 9" and the principle axis 9 coincide with the axis of rotation is relatively long in relation to the axial dimension of the cable set 2. The first sealing element 5, composed of the passage part 7 and first angle element 8, is secured in a bore in the vehicle wall 11, for example, is pressed in a bore body wall. The second sealing element 6 is secured in a bore in the door wall 10, namely, by means of locking elements 14 provided at the sealing element 6

As can be seen in FIGS. 1 and 2, the cable set 2 is not being bent during opening of the door, but is merely slightly twisted. The same is true for the hose 4 of the protective element. The cable set 2 is guided in the protective element and is thus fixed in its location. The angle elements 6, 8 bend the cable set 2 at two locations about approximately at a right angle. As a consequence, the cable set 2 is secured axially, so that the cable set 2 is prevented, during opening and closing, from being pulled or upset.

The protective element of the arrangement according to the invention, may also have two identical sealing elements.

For example, always both sealing elements, such as the first or the second of the above described sealing elements 5, 6 can be constructed in the same manner as the second of the above described sealing elements 5, 6. A passage part is optional and is not necessary for constructing the subject matter of the invention. Securing the cable set 2 in the protective element is effected by the geometry thereof, as described above.

Advantageously, the cable set can be secured to the motor vehicle door or body by means of a releasably fastened coupling element. This can be effected by means of a plug mounted at the cable set in the known manner and by a bushing provided in the door or the vehicle body. Consequently, as a result this makes it possible in case of repairs to disassemble and reassemble the motor vehicle door without having to completely disassemble and reassemble the protective element.

The invention claimed is:

1. Arrangement for electrically connecting electrical elements mounted on a door of a motor vehicle, wherein the door is pivotably connected at the vehicle body through at least two points of rotation about an axis of rotation,
   wherein a number of electrical lines connected to the electrical elements are combined into a cable set which is partially mounted in a free space between the vehicle body and the door,
   wherein the cable set is arranged and secured with a straight configuration between the two points of rotation surrounded by a protective element and wherein the center axis of the cable set corresponds at least partially to the axis of rotation of the door,
   wherein a hose as a protective element is arranged about the cable set, which surrounds the cable set in a manner maintaining said straight configuration of said cable set, abutting against the cable set, and which on its one end has a sealing element made of a passage part and an angle element, which is arranged media-tight in a borehole present in a wall of the body and which on its other end has a sealing element, which by means of locking elements, attached to the same, is fastened in a borehole present in a wall of the door, and wherein the hose is fastened detachably by means of a coupling element designed as a plug or socket to the door and to the body.

2. Arrangement according to claim 1, wherein the hose comprises an undulation.

* * * * *